J. R. PEIFER.
HOOF TRIMMER.
APPLICATION FILED MAY 12, 1908.
912,161.
Patented Feb. 9, 1909.
3 SHEETS—SHEET 1.
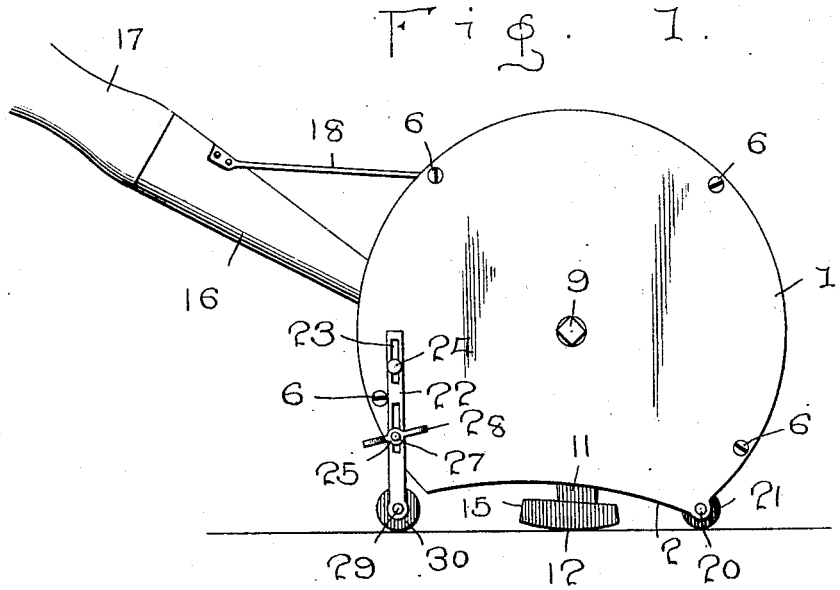
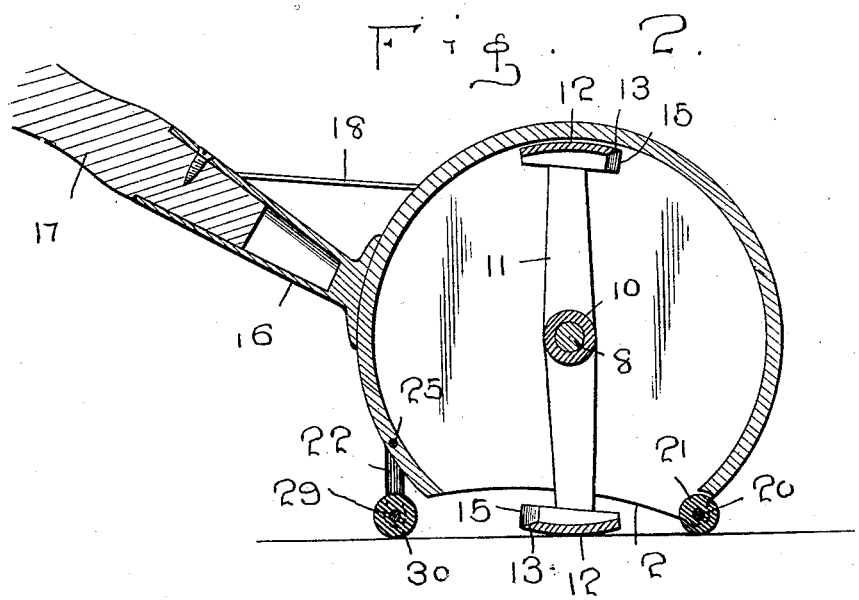
WITNESSES:
INVENTOR
J. R. Peifer
BY
Attorneys J. R. PEIFER.
HOOF TRIMMER.
APPLICATION FILED MAY 12, 1908.
912,161.
Patented Feb. 9, 1909.
3 SHEETS—SHEET 2.
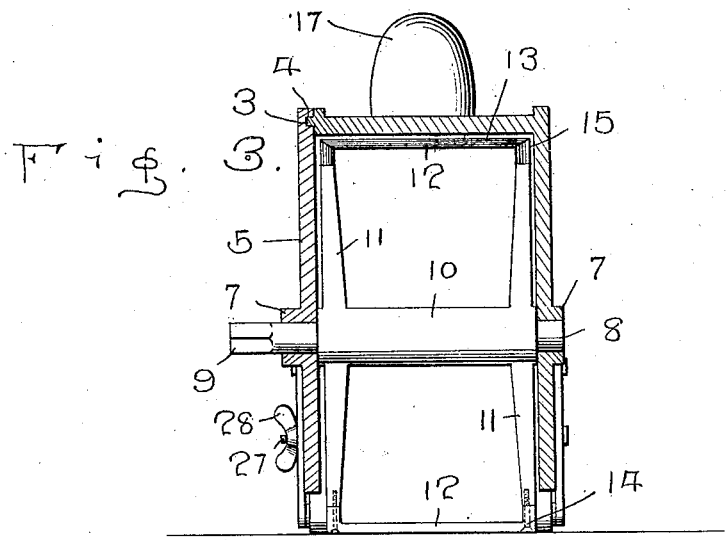
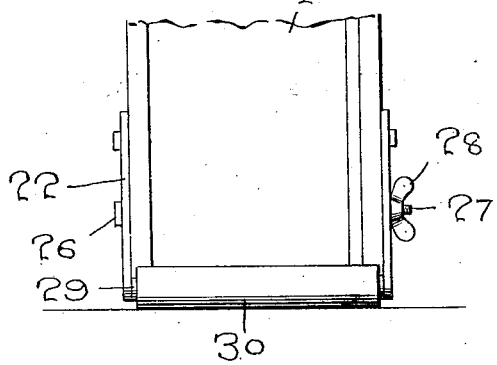
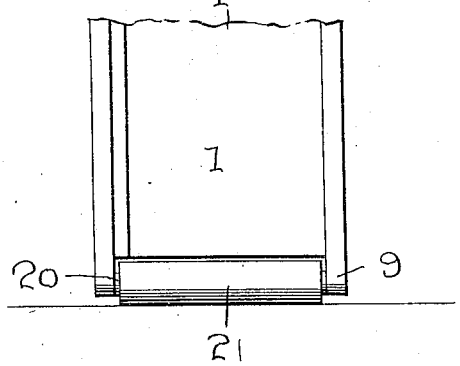
WITNESSES:
INVENTOR
J. R. Peifer
BY W. J. FitzGerald
Attorneys J. R. PEIFER.
HOOF TRIMMER.
APPLICATION FILED MAY 12, 1908.
912,161.
Patented Feb. 9, 1909.
3 SHEETS—SHEET 3.
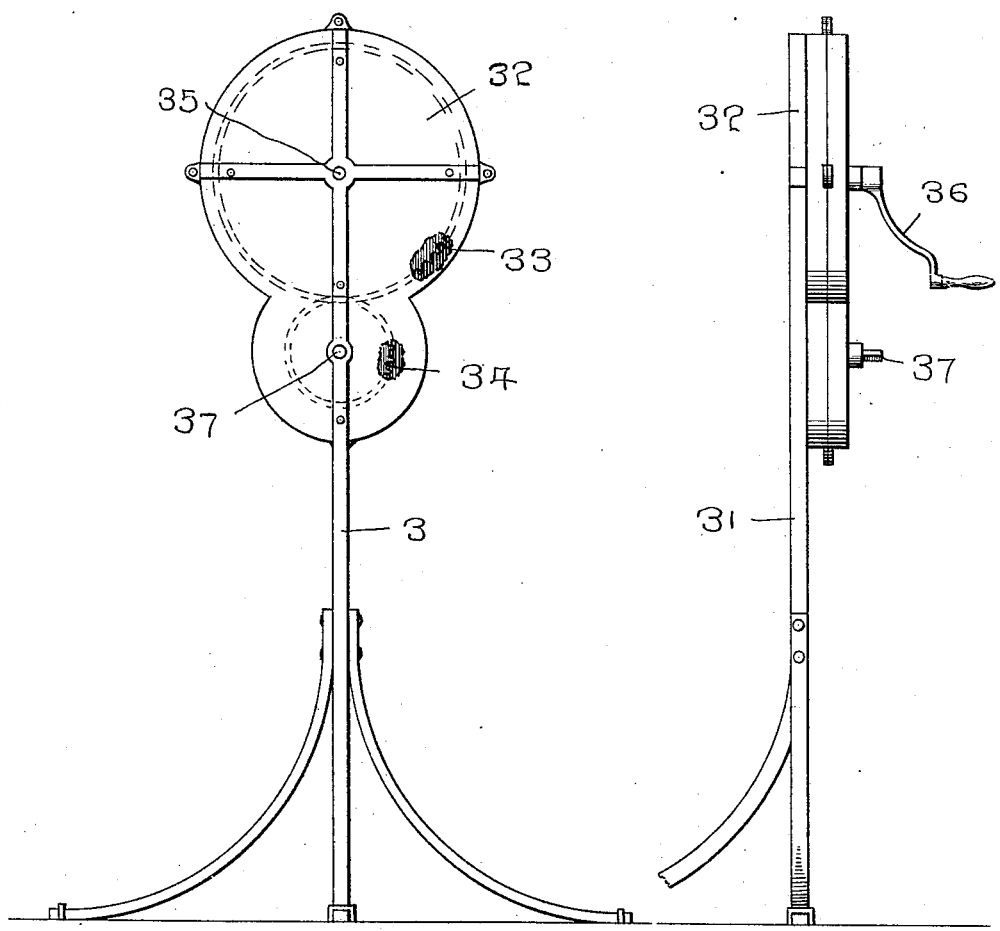
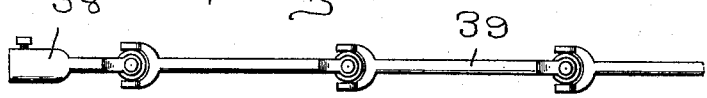
WITNESSES:
INVENTOR
J. R. Peifer
BY
W. J. FitzGerald
Attorneys

UNITED STATES PATENT OFFICE.

JAMES ROBERT PEIFER, OF CONYNGHAM, PENNSYLVANIA.

HOOF-TRIMMER.

No. 912,161.  Specification of Letters Patent.  Patented Feb. 9, 1909.

Application filed May 12, 1908. Serial No. 432,459.

*To all whom it may concern:*

Be it known that I, JAMES ROBERT PEIFER, a citizen of the United States, residing at Conyngham, in the county of Luzerne and State of Pennsylvania, have invented certain new and useful Improvements in Hoof-Trimmers; and I do hereby declare the following to be a full, clear, and exact description of the invention, such as will enable others skilled in the art to which it appertains to make and use the same.

This invention relates to new and useful improvements in hoof trimmers and it has primarily for its object to provide a novel device of this character, wherein a series of revolving cutting knives are employed.

It is also an object of the invention to provide a novel device of this character, wherein an adjustment of the cutting blades with relation to the hoofs may be had.

It is also an object of the invention to provide a novel device of this character which will be simple in construction, efficient in practice and comparatively inexpenive to manufacture.

With the above and other objects in view, the invention consists in the details of construction and in the novel arrangement and combination of parts to be hereinafter referred to.

In describing the invention in detail, reference will be had to the accompanying drawings forming part of this specification, wherein like characters of reference denote corresponding parts in the several views, and in which, Figure 1 is a view in side elevation of the invention. Fig. 2 is a longitudinal, sectional view of Fig. 1. Fig. 3 is a cross sectional view of Fig. 1. Fig. 4 is a fragmentary view in elevation of the rear of the device, and, Fig. 5 is a fragmentary view in elevation of the front of the device. Fig. 6 is a view partly in front elevation and partly in section illustrating an operating means for the invention. Fig. 7 is a side elevation thereof, and, Fig. 8 is a fragmentary view of a flexible shafting employed in operating the invention.

In the drawings, 1 denotes a casing of any desired configuration, but preferably circular, having its lower portion cut away tangentially as indicated at 2. The edges of the cut-away portion, are curved inwardly, so that the casing may be suitably positioned with relation to a hoof to be trimmed. One face of the casing is open and the free edge thereof is provided with a peripheral tongue 3, which extends within a corresponding groove 4 on the inner face of the detachable cover 5, which is held against displacement through the medium of the screws 6, as is particularly shown in Figs. 1 and 3.

Both of the face plates are provided with bearings 7 alining one with the other when assembled, and in these bearings 7 are mounted the end portions of a shaft 8. One of these end portions of the shaft 8 projects beyond a face of the casing 1 and is squared as at 9 in order that said shaft may be suitably coupled with any desired operating means. It is to be understood, of course, that the operating means is to be of such a character as to rotate the shaft 8.

Fixed to the shaft 8 between the face plates of the casing 1, when the device is assembled, is a sleeve 10, having extending therefrom in opposite directions, adjacent its ends, arms 11, to the ends of which are secured the cross pieces 12, each of which have a cutting edge 13. These cross pieces 12 may be secured to the arms 11 in any desired manner, but it has been found best in the practical operation of the device, that the same be held by the screws 14, passing through the cross pieces and engaging the ends of the arms 11. The arms 11 are so positioned on the sleeve 10, as to permit the cross pieces 11 to project beyond the cut-away portion and each projected end is provided with an inturned lug 15, at approximately right angles, provided with a cutting edge. By this arrangement, when the device is in operation, the inturned cutting edge 15 will prevent the hoof from being torn at the edges of the cut-away portion of the body of the cross piece.

It is also to be observed that the faces of the cross pieces 13 are curved transversely and that they project beyond the edgings of the arms 11. This is done in order that the cutting effect of the cross pieces may be in no way obstructed, as is believed to be apparent.

In applying this device, it is intended that the same be held by the operator and in order that he may effectually grasp the same, the socket 16 is effectually held to the casing 1 and in said socket projects a handle 17. The method of holding the handle 17 within the socket may be in any ordinary manner, as this attachment forms no part of the present invention. It has also been found best in practice, that to brace the socket 16, a rod 18 be interposed between the casing 1 and the socket 16 and secured thereto in any desired manner. When assembled, the portion of the casing to which the socket 16 is secured, is known as the rear of the machine.

Each face of the casing 1 adjacent the forward end of the tangentially cut portion 2, is provided with an ear 19 and in these ears 19 is mounted a shaft 20, which passes centrally of an elastic roller 21. To each of the faces of the casing of the cut-away portion 2, is slidably fixed a stem 22. This stem 22 is provided with a plurality of longitudinal slots 23, preferably two in number. Through the upper slot 23 passes a headed retaining bolt 24 secured to the face of the casing, while through the lower slot 23 passes a bolt, which also passes entirely through the edge wall of the casing and through the lower slot of the stem 22 on the opposite side of the casing. One end of this bolt 25 is provided with a head 26, while the opposite end portion 27 is screw-threaded. This threaded portion 27 is engaged by a winged nut 28, which, after the sliding members 22 have been moved to effect the desired adjustment of the casing, with relation to a hoof to be trimmed, is rotated in the proper direction when both of the members will be clamped against movement, as is believed to be apparent. The lower ends of the members 22 have mounted therein, a shaft 29, passing centrally of an elastic roller.

It is thought from the drawings in the foregoing description, that the operation of the device is clearly apparent, although it may be well to state that the shaft 8 is rotated in a direction to cause the cutting edges 13 of the cross pieces 15 to properly contact with the hoof to be trimmed and that the cutting edges of the cross pieces extend in the same direction. It is also thought well to observe that while any number of cross pieces may be employed, it has been found best in the actual operation of the device, to employ but two and that the cross arms 11 be so positioned on the sleeve 10, as to have the cross pieces opposed one to the other.

In applying the device to the hoof to be trimmed, the rollers 21 are first brought into contact with the hoof and the depth of the cut of the cross pieces will be controlled or regulated through the adjustable members 22, as is thought to be apparent.

While any means may be employed to rotate the shaft 8 it has been found advantageous to employ the mechanism shown in Figs. 6, 7 and 8. In this form an upright frame 31 is shown having affixed to its upper portion a casing 32. Within this casing 32 is mounted a large gear wheel 33 meshing with a smaller gear wheel 34. The larger gear wheel 33 has its shaft 35 projected and this projected portion is engaged by an operating crank 36. The shaft 37 of the gear wheel 34 is also projected and is adapted to be engaged by a socket 38 on a flexible shafting 39. The opposite end of the flexible shafting 39 is provided with a socket (not shown) similar to the socket 38, and this socket is intended to engage the squared portion 9 of the shaft 8.

I claim:

1. In a device of the character described, the combination of a casing, revoluble cutting blades mounted within the casing and contacting rollers carried by the casing, certain of said rollers being adjustable with relation to the casing.

2. In a device of the character described, the combination of a casing having a portion cut away, revoluble cutting blades mounted within the casing projecting beyond the cut-away portion of the casing and contacting rollers carried by the casing adjacent each end of the cut-away portion of the casing, certain of said rollers being adjustable with relation to the casing.

3. In a device of the character described, the combination with a casing having an open portion, a shaft mounted within the casing, a sleeve on the shaft, arms projecting from the sleeve, said arms being of such length as to project beyond the cut-away portion of the casing and cutting blades secured to the free ends of the arms.

4. In a device of the character described, the combination with a casing having an open portion, a shaft mounted within the casing, a sleeve on the shaft, arms projecting from the sleeve, said arms being of such length as to project beyond the cut-away portion of the casing and cutting blades secured to the free ends of the arms, said cutting blades having inturned angular portions.

5. In a device of the character described, the combination of a casing, revoluble blades mounted therein, a roller mounted in the casing, stems slidably held by the casing and a second roller mounted in the stems.

6. In a device of the character described, the combination of a casing having a portion open, revoluble blades within the casing adapted to project beyond the open portion thereof, a roller mounted in the casing adjacent one end of the cut-away portion, stems mounted on the casing, projecting beyond the cut-away portion adjacent the opposite end thereof and a second roller mounted in the stems.

In testimony whereof I have signed my name to this specification in the presence of two subscribing witnesses.

JAMES ROBERT PEIFER.

Witnesses:
OSCAR SCHAEFER,
EARL HELLER.